(12) United States Patent
Anaya et al.

(10) Patent No.: US 10,032,256 B1
(45) Date of Patent: Jul. 24, 2018

(54) SYSTEM AND METHOD FOR IMAGE PROCESSING USING AUTOMATICALLY ESTIMATED TUNING PARAMETERS

(71) Applicant: The Florida State University Research Foundation, Inc., Tallahassee, FL (US)

(72) Inventors: Josue Anaya, Tallahassee, FL (US); Adrian Barbu, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 15/355,777

(22) Filed: Nov. 18, 2016

(51) Int. Cl.
| | | |
|---|---|---|
| *G06K 9/66* | (2006.01) | |
| *G06T 5/00* | (2006.01) | |
| *G06T 7/00* | (2017.01) | |
| *G06T 3/40* | (2006.01) | |

(52) U.S. Cl.
CPC ............ *G06T 5/002* (2013.01); *G06T 3/4053* (2013.01); *G06T 7/0081* (2013.01); *G06T 2207/20081* (2013.01); *G06T 2207/20084* (2013.01); *G06T 2207/20182* (2013.01)

(58) Field of Classification Search
CPC .......... G06K 9/66; G06K 9/4628; G06K 9/32; G06K 9/2013; G06K 9/344; G06T 5/002; G06T 7/0081; G06T 3/4053
See application file for complete search history.

(56) References Cited

U.S. PATENT DOCUMENTS

| | | | | |
|---|---|---|---|---|
| 2016/0148078 | A1* | 5/2016 | Shen | G06K 9/66 |
| | | | | 382/158 |
| 2016/0210723 | A1* | 7/2016 | Yang | G06N 3/00 |
| 2016/0217369 | A1* | 7/2016 | Annapureddy | G06N 3/082 |
| 2016/0350336 | A1* | 12/2016 | Checka | G06F 17/30268 |
| 2017/0032222 | A1* | 2/2017 | Sharma | G06K 9/6256 |
| 2017/0140236 | A1* | 5/2017 | Price | G06K 9/2081 |
| 2017/0193097 | A1* | 7/2017 | Cramer | G06F 17/30705 |
| 2017/0220891 | A1* | 8/2017 | Kim | G06K 9/344 |

OTHER PUBLICATIONS

Barbu. Training an Active Random Field for Real-Time Image Denoising. IEEE Transactions on Image Processing. 2009. vol. 18 (No. 11): 2451-2462.
Anaya and Barbu. RENOIR—A Dataset for Real Low-Light Noise Image Reduction. arXiv: 1409.8230. Sep. 2014: 1-26.

* cited by examiner

*Primary Examiner* — Amir Alavi
(74) *Attorney, Agent, or Firm* — Molly L. Sauter; Smith & Hopen, P.A.

(57) ABSTRACT

Imaging processing techniques using a trained convolution neural network (CNN) are described. In one or more implementations, an image processing system and method are provided for applying an image processing algorithm to a dataset of training images to generate a plurality of performance curves, constructing a loss function based upon the plurality of performance curves, training a convolutional neural network (CNN) to optimize the loss function to establish a trained convolutional neural network, predicting a specific tuning parameter for an image of interest using the trained convolution neural network and performing image processing of the image of interest using the specific tuning parameter and the image processing algorithm to generate a processed image of interest.

19 Claims, 9 Drawing Sheets

SYSTEM AND METHOD FOR IMAGE PROCESSING USING AUTOMATICALLY ESTIMATED TUNING PARAMETERS

BACKGROUND OF THE INVENTION

In the field of computer vision, the task of noise estimation is very important for various applications, including image denoising, image segmentation, and image inpainting. Low-light, uncompressed noisy image datasets are commonly used to study the performance of various image denoising algorithms on artificial Gaussian noise. However, it is known that real cameras used to provide the images for the image datasets studied do not produce artificial Gaussian noise.

Working with artificial Gaussian noise allows for the simplicity of experimenting by using a single constant noise value defined by the experimenter and avoids the difficulty inherent in estimating the noise level function in real low-light noisy images. However, what is currently needed in the art is a model to better estimate various tuning parameters for use in image processing algorithms. In particular an improved system and method are needed for estimating a tuning parameter for use in a denoising algorithm, which will lead to better denoising results.

Accordingly, what is needed in the art is a system and method for automatically estimating tuning parameters for use in image processing algorithms.

SUMMARY OF INVENTION

In one or more implementations, an image processing system and method are provided for applying an image processing algorithm to a dataset of training images to generate a plurality of performance curves, constructing a loss function based upon the plurality of performance curves, training a convolutional neural network (CNN) to optimize the loss function to establish a trained convolutional neural network, predicting a specific tuning parameter for an image of interest using the trained convolution neural network and performing image processing of the image of interest using the specific tuning parameter and the image processing algorithm to generate a processed image of interest.

In one embodiment, a method for image processing includes applying an image processing algorithm, over a range of possible tuning parameters, to a dataset of training images to generate a plurality of performance curves. The method further includes, constructing a loss function based upon the plurality of performance curves and then training a convolutional neural network (CNN) to optimize the loss function to establish a trained convolutional neural network. After the CNN has been trained, the method continues by predicting a specific tuning parameter for an image of interest using the trained convolutional neural network and performing image processing of the image of interest using the specific tuning parameter and the image processing algorithm to generate a processed image of interest.

Due to the differences in the noise levels across the image of interest, the method may further include, first dividing each of the training images of the dataset of training images into a plurality of training images patches and then applying the image processing algorithm to each of the training image patches to generate the plurality of performance curves. The CNN is then trained to optimize the loss function that is constructed based upon the plurality of performance curves from the plurality of image training patches. The trained CNN can then be used to process the image, wherein the image of interest is first divided into a plurality of image patches and then the trained CNN is used to predict a specific tuning parameter for each of the image patches of the image of interest using the trained convolutional neural network. Each of the image patches are then processed using the specific turning parameter of each of the image patches of the image of interest and the image processing algorithm to generate a plurality of processed image patches. The plurality of processed image patches are then combined to generate the processed image of interest.

In a particular embodiment the image processing performed on the image of interest is image denoising and the method includes, dividing each training image of a dataset of training images into a plurality of training images patches and applying an image denoising algorithm, over a range of possible tuning parameters, to each of the plurality of training image patches to generate a plurality of performance curves. The denoising method further includes, constructing a loss function based upon the plurality of performance curves and training a convolutional neural network (CNN) to optimize the loss function to establish a trained convolutional neural network. Following the training of the CNN, the method continues by dividing a noisy image of interest into a plurality of image patches, predicting a specific tuning parameter for each of the image patches of the noisy image of interest using the trained convolutional neural network, performing image denoising of each of the image patches of the noisy image of interest using the specific tuning parameter of each of the image patches of the noisy image of interest and the image processing algorithm to generate a plurality of denoised image patches and finally, combining the plurality of denoised image patches to generate a denoised image of interest.

In another embodiment, a system for image processing is provided. The system includes, one or more modules implemented at least partially in hardware, the one or more modules configured to perform operations comprising, applying an image processing algorithm, over a range of possible tuning parameters, to a dataset of training images to generate a plurality of performance curves and constructing a loss function based upon the plurality of performance curves. The one or more modules are further configured to perform operations for training a convolutional neural network (CNN) to optimize the loss function to establish a trained convolutional neural network, predicting a specific tuning parameter for an image of interest using the trained convolutional neural network and performing image processing of the image of interest using the specific tuning parameter and the image processing algorithm to generate a processed image of interest.

Accordingly, in various embodiments, the present invention provides a system and method for automatically estimating tuning parameters for an image processing algorithm using a convolution neural network and utilizing the estimated tuning parameters and image processing algorithm to provide image processing.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PRESENT INVENTION

Image processing techniques, including image denoising, image super-resolution and image segmentation and image inpainting are described herein. In one or more implementations, an image processing approach in accordance with the present invention generates tuning parameters for imaging algorithms using a convolutional neural network and utilizes the tuning parameters to process various images of interest.

Figure 1:
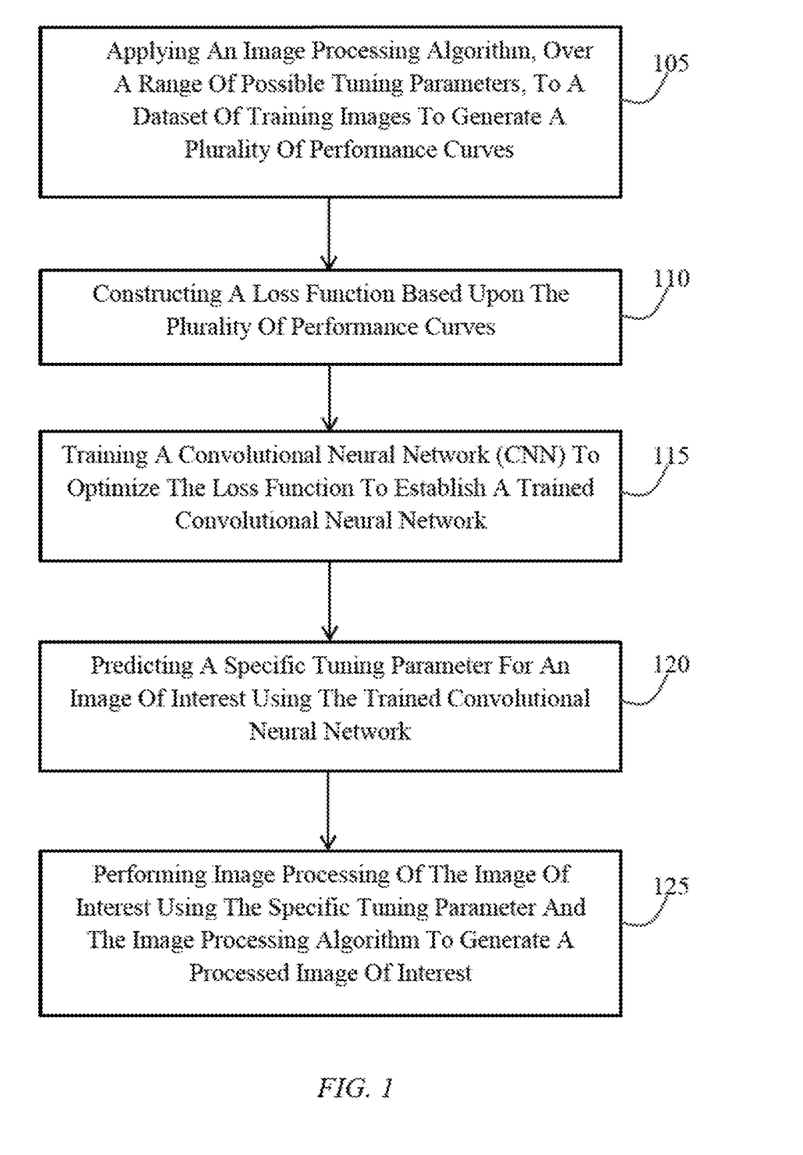
FIG. 1 is a diagram illustrating the image processing method in accordance with an embodiment of the present invention.

With reference to FIG. 1, in a particular embodiment the present invention provides an image processing method. In general, the method includes training a convolutional neural network (CNN) and then using the trained CNN to predict specific tuning parameters to be used with an appropriate image processing algorithm to process an image of interest. More specific, the exemplary method includes, applying an image processing algorithm, over a range of possible tuning parameters, to a dataset of training images to generate a plurality of performance curves 105. Following the generation of the plurality of performance curves 105, the method continues by constructing a loss function based upon the plurality of performance curves 110 and training a convolutional neural network (CNN) to optimize the loss function to establish a trained convolutional neural network 115. After the CNN has been trained to optimize a loss function 115, the method continues by predicting a specific tuning parameter for an image of interest using the trained convolutional neural network 120 and performing image processing of the image of interest using the specific tuning parameter and the image processing algorithm to generate a processed image of interest 125.

It is known that tuning parameters may vary across the image of interest, due to different noise levels or other variables. In order to provide a more flexible denoising method, in an additional embodiment, the dataset of training images may be divided into a plurality of training image patches prior to training the CNN. With this method, there are more images available to train the CNN to estimate the tuning parameter, thereby providing a more flexible denoising solution. In addition, the image of interest is also divided into a plurality of image patches and a specific tuning parameter is then predicted for each of the image patches of the image of interest using the trained CNN. The image of interest is then processed using the predicted specific turning parameters and the image processing algorithm to generate a plurality of processed image patches. The processed image patches are then combined to generate the processed image of interest.

In the present invention, novel loss functions are utilized for the training of the CNN, including a loss function for maximizing peak signal-to-noise ratio (PSNR) loss over the dataset of training images and a loss function for the maximizing variance over the dataset of training images.

In various embodiments, the method of the present invention the image processing algorithm may be a denoising algorithm selected from a Block-Matching and 3D Filtering (BM3D) denoising algorithm, an Active Random Field algorithm, a Bi-Level Optimization Algorithm and a Multi-Layer Perceptron algorithm.

Denoising techniques may be utilized to remove noise from an image that may be introduced by an image capture device, as a result of poor resolution or light sensitivity, or to remove noise introduced by the environment in which the image was captured, such as a low light environment.

An exemplary image denoising method and system are now described to provide additional details of the techniques provided by the invention. The exemplary embodiment is not meant to be limiting and it is considered within the scope of the present invention to expand the exemplary embodiment to include other image processing techniques, such as super-resolution, image segmentation and image inpainting.

Benchmark datasets of uncompressed color images corrupted by natural noise due to low-light conditions, together with spatially and intensity-aligned low noise images of the same scenes are known in the art. One well known dataset (RENOIR) contains over 120 scenes and more than 400 images, including both 16-bit RAW images and 8-bit BMP pixel and intensity-aligned images from 2 digital cameras (Canon S90 and Canon T3i) and a mobile phone (Xiaomi Mi3). The RENIOR dataset also includes a method for reliable noise estimation of a noisy image using the combination of two additional low-noise image pairs which approximate a ground truth image. Using the formulas:

$$\sigma^2(\epsilon) = \frac{1}{2}\sigma^2(I^r - I^c) \qquad (1)$$

$$\sigma^2(\epsilon) = \text{var}(I^n - I^a) - \frac{1}{4}\text{var}(I^r - I^c) \quad (2)$$

wherein $I^a$ is calculated as the average between two clean (low noise) image patches, which are small square regions of the image. The noise in an image is then estimated using equation 2, respective of their color channels. Equation 1 is used to estimate the noise in one of the clean (low noise) image patches. This method for noise estimation and the RENOIR dataset are vital to the development of a data driven model that can perform automatic noise estimation in real low-light noisy images.

The RENOIR dataset provides both the real low-light 32×32×1 input image patches, which are the focus of the exemplary embodiment, and a reliable estimate of their noise level σ, as previously stated.

The Block Matching and 3D filtering (BM3D) denoising algorithm has shown superior performance over other algorithms in the art utilizing the RENOIR dataset of images. While other denoising algorithms typically utilize Gaussian trained filters at σ=20 or σ=25 levels, the BM3D algorithm has shown the best performance using a σ=50 noise level even though the average estimated noise level of the RENOIR dataset was around σ=20. As such, it is possible that the true overall noise level estimate for an image may not be the best parameter for denoising utilizing the BM3D algorithm.

Figure 2A:
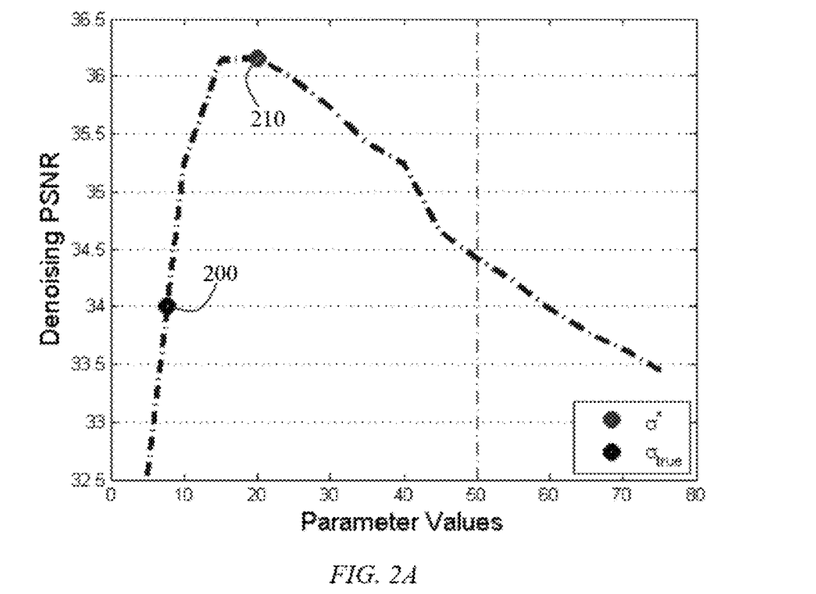
FIG. 2A is a graphical illustration of BM3D denoising performance, in accordance with an embodiment of the present invention.
Figure 2B:
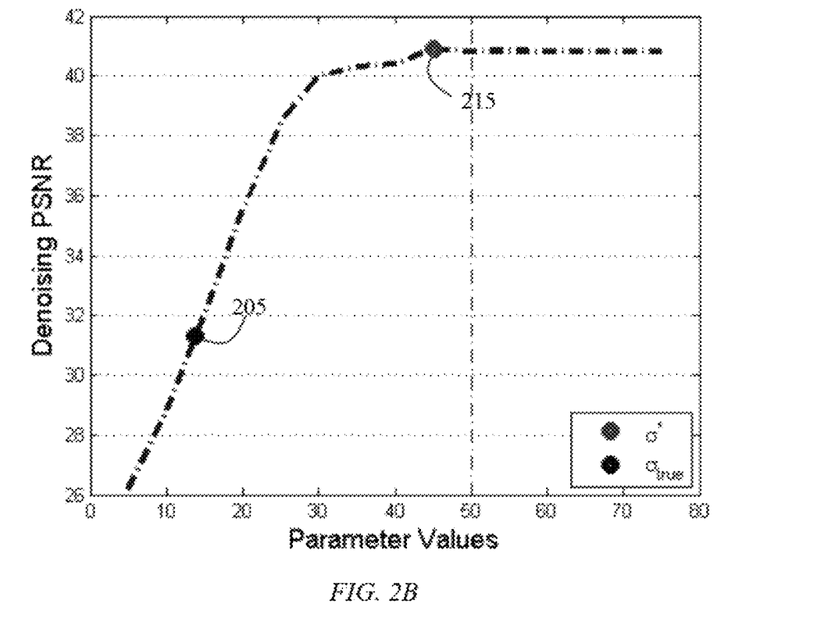
FIG. 2B is a graphical illustration of BM3D denoising performance, in accordance with an embodiment of the present invention.

FIG. 2A and FIG. 2B illustrate the BM3D performance (measured as the PSNR of the denoised image) for various values of the BM3D parameter σ for two S90 images. Also shown as at a first indicator 200, 205 is the performance at the true noise level of the image and it can be observed that the best denoising does not take place at the true noise level, but instead occurs at much larger values of σ, as shown at a second indicator 210, 215. The best BM3D denoising performance occurs at the parameter value that provides the largest PSNR.

From FIG. 2A and FIG. 2B it can also be observed that the PSNR depends smoothly on the BM3D parameter σ. Based on this observation, the BM3D can be improved by predicting the best possible BM3D parameter σ using a convolution neural network (CNN).

Figure 3:
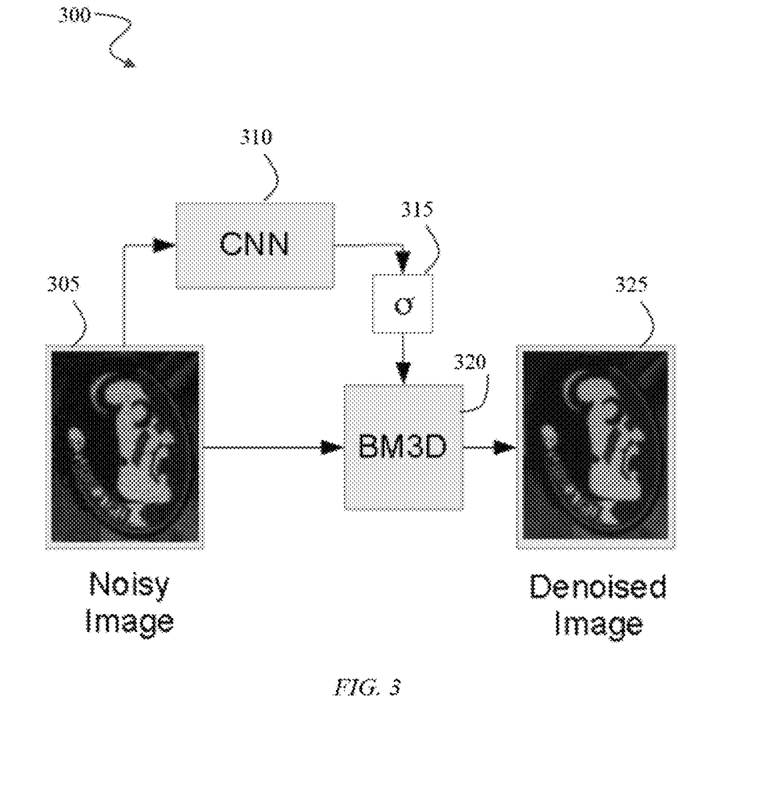
FIG. 3 is a block diagram illustrating a denoising system, in accordance with an embodiment of the present invention.
Figure 4:
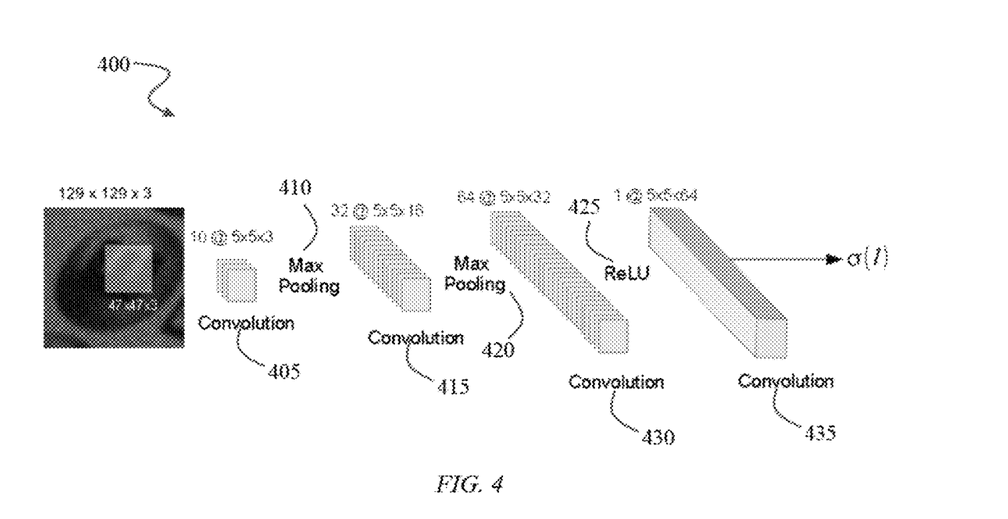
FIG. 4 is a diagram illustrating a convolutional neural network to predict a BM3D noise parameter, in accordance with an embodiment of the present invention.

FIG. 3 illustrates the proposed BM3D denoising scheme in accordance with an embodiment of the present invention. As shown in FIG. 4, a system 300 is provided for processing an image, such as a noisy image 305. The system 300 includes one or more modules 310 implemented at least partially in hardware, the one or more modules configured to perform operations comprising, applying an image processing algorithm, over a range of possible tuning parameters, to a dataset of training images to generate a plurality of performance curves and constructing a loss function based upon the plurality of performance curves. The one or more modules 310 are further configured to perform operations for training a convolutional neural network (CNN) to optimize the loss function to establish a trained convolutional neural network, predicting a specific tuning parameter 315 for an image of interest using the trained convolutional neural network and performing image processing of the image of interest 305 using the specific tuning parameter and the image processing algorithm 320 to generate a processed image of interest 325.

More exactly, given an image patch I the CNN is a function $\sigma_w(I)$ with the vector of weights to be learned w.

The CNN is trained to optimize a loss function over the training examples $(I_i, y_i)$, $i=1, \ldots, n$:

$$L(w) = \Sigma_{i=1}^n l(\sigma_w(I_i), y_i) \quad (3)$$

Where the form of $y_i$ and the loss function $l(u, y)$ depend on what is trying to be optimized.

Three loss functions defined in terms of the smooth PSNR functions $p_i(\sigma)$ obtained for each training example $I_i$ are investigated as piecewise linear approximations over a grid of values σ. These loss functions are characterized as:

(1) Predicting $\sigma^*_i = \text{argumax}_\sigma p_i(\sigma)$ directly using the $L_2$ loss $l(u, y) = \|u-y\|^2$. In this case $y_i = \sigma^*_i$ is the parameter that maximized the BM3D denoising PSNR for training example $I_i$.

(2) Maximizing the PSNR loss:

$$L(w) = \Sigma_{i=1}^n p_i(\sigma_w(I_i)), \quad (4)$$

Thus, $l(u, p) = p(u)$ and $y_i = p_i$, given as a vector of PSNR values on a grid and approximated as a piecewise linear function.

(3) Maximizing the variance $$L(w) = \Sigma_{i=1}^n \text{var}_i(\sigma_w(I_i)) \quad (5)$$

where $p_i(\sigma) = 10 \log_{10}(255^2/\text{var}_i(\sigma))$, thus $\text{var}_i(\sigma)$ is the variance of the difference between denoised image $I_i$ by BM3D with parameter σ and its clean counterpart. In this case $y_i = \text{var}_i$ is a vector of values on a grid and is approximated as a piecewise linear function.

It is believed that the loss functions of Eq. 4 and Eq. 5 are novel loss functions that have not previously been used in CNN training. The derivative of a piecewise linear function is a piecewise constant function and this fact is used in back-propagation when training the CNN.

In an exemplary embodiment for estimating the BM3D parameter σ, MatCovNet[2] was modified by adding the three loss functions previously described.

In this embodiment, the training examples are image patches of size 129×129×3 and their corresponding $y_i$ (where the variance and PSNR functions were approximated as piecewise linear with 15 endpoints). The CNN uses a randomly cropped patch size 47×47×3.

With reference to FIG. 4, the first layer of the CNN 400 is a convolutional layer 405 with 16 kernels of size 5×5×3 followed by max-pooling 410. The second convolutional layer 415 has 32 kernels of size 5×5×16 followed by max-pooling 520. Then follows a third convolutional layer 425 with 64 kernels of size 5×5×32 followed by a ReLU (rectified liner unit) 430 function. Then follows a single kernel 435 of size 5×5×64 which is the output neuron returning σ(I).

In various experimental examples, the trained CNN models of the present invention were compared to various other methods of noise estimation. In these experiments, the CNN models were trained using stochastic gradient descent with momentum of 0.9 and weight decay of 0.0001. Only the convolutional layer had shared biases enabled and padding was set to 2, to minimize border effects. The initial learning rate was set to 0.1 and after 15 epochs, the learning rate was reduced to 0.001. The models trained for a total of 25 epochs using over 3 million image patches per camera. Using a 12 GM NVidia Tesla K40c GPU, the training per camera took about 5 minutes.

One application where noise estimation would be quite useful is in image denoising. A special form of BM3D, CBM3D meant for color images use a single noise parameter σ that is based on a Gaussian assumption to perform its denoising. As stated earlier the BM3D noise parameter can be approximated using a CNN with the defined loss functions in accordance with the present invention.

In accordance with an embodiment of the present invention, a method for denoising an image of interest includes first dividing each training image of a dataset of training images into a plurality of training images patches and then applying an image denoising algorithm, over a range of possible tuning parameters, to each of the plurality of training image patches to generate a plurality of performance curves. Following the generating of the plurality of performance curves, the method continued by constructing a loss function based upon the plurality of performance curves and training a convolutional neural network (CNN) to optimize the loss function to establish a trained convolutional neural network. A noisy image of interest is then divided into a plurality of image patches and the method continues by predicting a specific tuning parameter for each of the image patches of the noisy image of interest using the trained convolutional neural network. The method continues by performing image denoising of each of the image patches of the noisy image of interest using the specific tuning parameter of each of the image patches of the noisy image of interest and the image processing algorithm to generate a plurality of denoised image patches and then combining the plurality of denoised image patches to generate a denoised image of interest.

In various embodiments, the loss function may be a function for maximizing peak signal-to-noise ratio (PSNR) loss over the dataset of training images or a function for maximizing variance over the dataset of training images.

In various embodiments, the image denoising algorithm may be selected from a Block-Matching and 3D Filtering (BM3D) denoising algorithm, an Active Random Field algorithm, a Bi-Level Optimization Algorithm and a Multi-Layer Perceptron algorithm.

Table 2 shows the image denoising results of the CNN method in accordance with the present invention with CBM3D in PSNR for one noisy image from each scene in the RENOIR image dataset. On average, a high noise value estimate like $\sigma=50$ gives incredible denoising results, however it is shown that the CNN model of the present invention was capable of helping make CBM3D perform even better and with less variability.

TABLE 2

Image denoising PSNR results

| Denoising Methods | Mi3 | S90 | T3i | Average |
|---|---|---|---|---|
| Before denoising | 23.49 | 27.80 | 27.44 | 26.24 |
| Use σ = 50 | 32.35 | 36.75 | 39.97 | 36.36 |
| Regress σ directly | 32.46 | 36.80 | 39.81 | 36.36 |
| Optimize Var | 32.87 | 36.46 | 39.81 | 36.71 |
| Optimize PSNR | 32.91 | 36.97 | 39.85 | 36.58 |
| Signal dependent w/CBM3D | 24.97 | 31.85 | 33.83 | 30.22 |
| GAT-VST w/CBM3D | 26.88 | 27.40 | 28.70 | 27.66 |
| Iterative Poisson-VST RGB w/BM3D | 32.28 | 29.74 | 38.53 | 33.52 |

Figure 5:
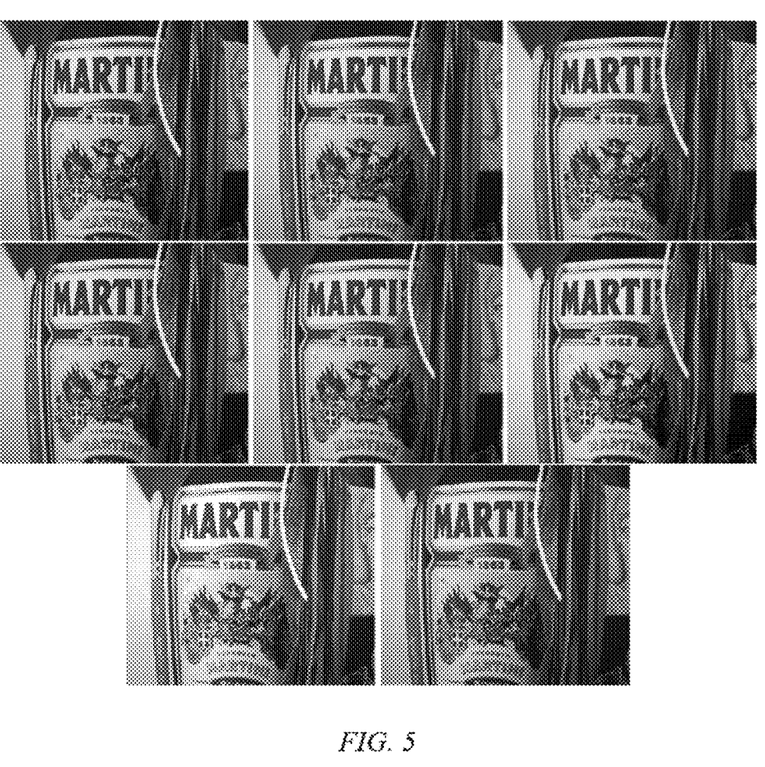
FIG. 5 is an illustration of various denoising methods and their appropriate PSNR, in accordance with an embodiment of the present invention.

FIG. 5 illustrates an example of the various denoising methods on a noisy image from the S90 data. In FIG. 5, Top left: Noisy image (28.48). Top Middle: σ=50 (36.75). Top right: Regress σ=(36.94). Middle left: Optimize Var (36.96). Middle middle: Optimize PSNR (36.69). Middle right: GAT-VST (27.47). Bottom left: Poisson-VST (28.82). Bottom right: Signal Dependent (34.56).

In various embodiments, the present invention uses a convolutional neural network (CNN) to predict the noise level σ in a plurality of image patches of an image of interest. In a specific embodiment, the CNN may be trained on all the noisy images in the RENOIR dataset and only on one of the two low-noise images per scene. The loss function in the CNN will then be a sum of squares difference and this will allow for the direct regression or estimation of the noise level from the input image of interest. In a specific embodiment, Cuda Covnet1 may be used to develop the convolution neural network (CNN), as is commonly known in the art.

Figure 6:
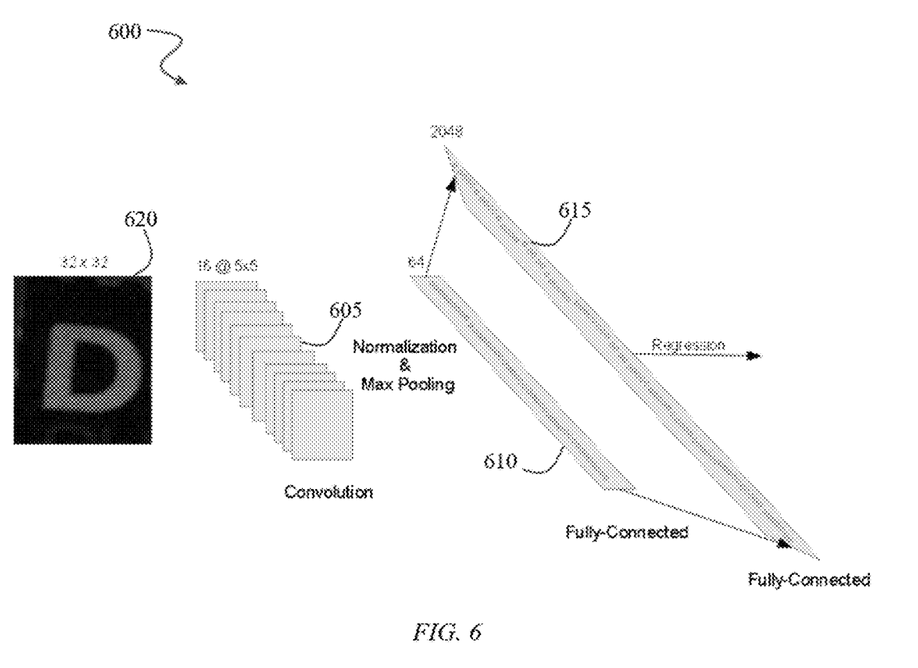
FIG. 6 is diagram illustrating the convolutional neural network (CNN) architecture in accordance with an embodiment of the present invention.

FIG. 6 illustrates an exemplary CNN architecture 600 in accordance with the present invention. The CNN architecture includes a single convolution layer 605 and two fully connected layers 610, 615. A sum of squares cost layer is used for regression predictions of the noise level for the input patch 620. The data was first pre-processed by dividing the noisy image's RGB channels by their respective standard deviations. This was the only form of preprocessing done to the data and this was only done for later evaluations.

To prevent any possible overfitting, the model may be trained to predict the noise level for independent RGB channels. In operation, the first convolutional layer 605 filters the 32×32×1 input image patches 620 with 16 kernels of size 5×5×1 with 1 pixel stride and the output neurons are fitted with rectified linear units (ReLU). Two fully connected layers with 64 neurons 610 and 2048 neurons 615, respectively, then take as input, the normalized and pooled output of the first convolutional layer 605.

The first experiment conducted was to see how well the CNN model would predict the noise level for each camera in the RENOIR data set. To examine how well the CNNs trained, a 4-fold cross validation was performed by leaving out ten different image batches for each fold.

As stated earlier, the data was preprocessed by dividing the images into color channels and the color channels into patches of size 32×32. For each color channel, the per-patch noise estimates were normalized by dividing to the standard deviation of the entire color channel. This way, the noise level can be recovered by multiplying the prediction with the standard deviation of the color channel.

To evaluate the model fitting the standard goodness of fit measure was used $$R^2 = 1 - \frac{SS_{res}}{SS_{tot}} = 1 - \frac{\sum_{i=1}^{n}(y_i - \hat{y}_i)^2}{\sum_{i=1}^{n}(y_i - \bar{y})^2} \qquad (6)$$

Where, $y_i$ is the true noise in the image patch divided by the standard deviation of its respective noise channel, $\hat{y}_i$ is the predicated noise to standard deviation ratio for a particular image patch and $\bar{y}$ is the mean of $y_i$.

Figure 7A:
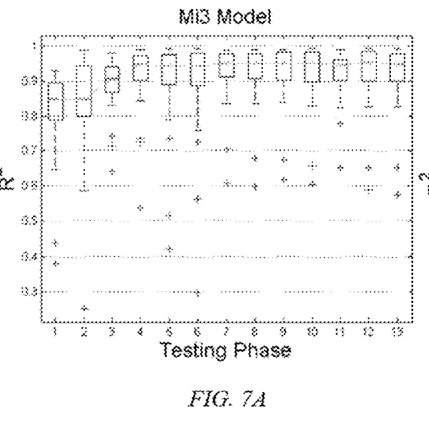
FIG. 7A is a graphical illustration of the goodness of fit measure for a Mi3 model camera, in accordance with an embodiment of the present invention.
Figure 7B:
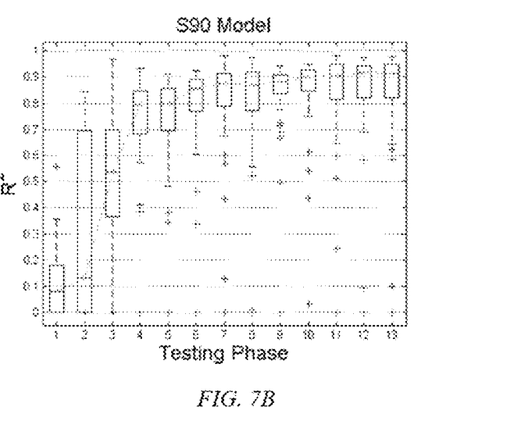
FIG. 7B is a graphical illustration of the goodness of fit measure for a S90 model camera, in accordance with an embodiment of the present invention.
Figure 7C:
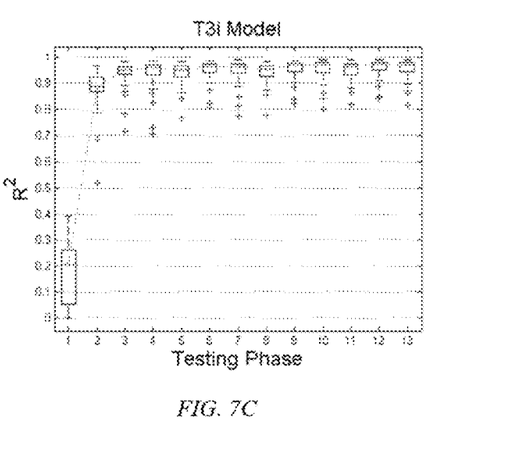
FIG. 7C is a graphical illustration of the goodness of fit measure for a T3i model camera, in accordance with an embodiment of the present invention.
Figure 8:
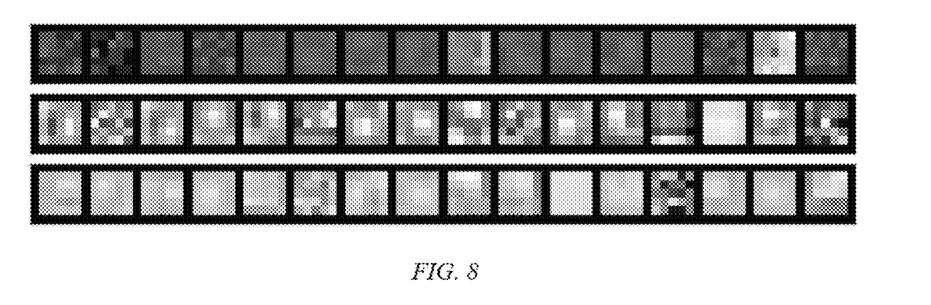
FIG. 8 is an illustration of the convolutional kernels learned in the first convolutional layer, in accordance with an embodiment of the present invention.

The cross-validated results on the test set can be seen in FIG. 7A-FIG. 7C. From FIG. 7A-FIG. 7C one can see that after a few epochs of training, the CNN models are able to perform very good noise estimation on the testing data. For all 3 cameras, the models were able to reach an average $R^2$ greater than 90%. The S90 camera model however, had some difficulty with a few image batches, as shown in FIG. 7B. FIG. 8 illustrates the learned filters of each of the models in the first convolution layer. The RENOIR dataset contained images for a Xiaomi Mi3 phone camera, a Canon S90 digital camera and a Canon EOS Rebel T3i. In FIG. 8, the results from the Mi3 filters are in the top row, the S90 filters are in the middle row and the T3i filters are in the bottom row.

Figure 9A:
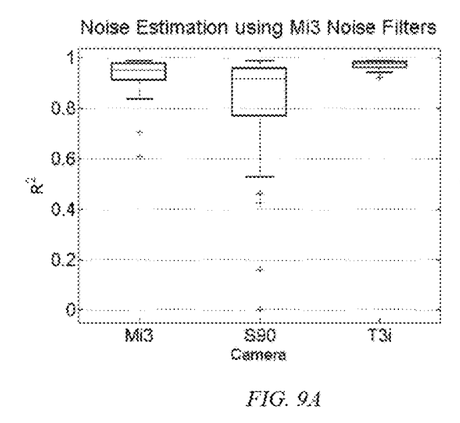
FIG. 9A is a graphical illustration of the comparison of the goodness of fit measure for cross camera performance with an Mi3 model camera.
Figure 9B:
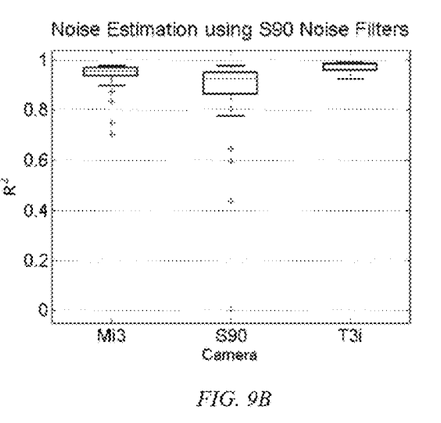
FIG. 9B is a graphical illustration of the comparison of the goodness of fit measure for cross camera performance with an S90 model camera.
Figure 9C:
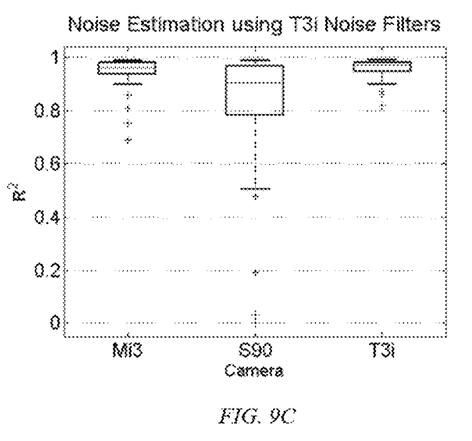
FIG. 9C is a graphical illustration of the comparison of the goodness of fit measure for cross camera performance with a T3i model camera.

Another study performed was focused on observing whether or not the models were capable of cross camera independence. Using the previously described models, their noise estimation performance was tested on images from cameras that were different than the camera they were trained on. The results of this cross camera experiment are illustrated in FIG. 9A-FIG. 9C.

It can be see that the models performed well in noise estimation regardless of the camera images that were used in training. The median $R^2$ being above 90% for all the cross camera testing indicates that the models are capable of being camera and device independent.

Figure 10:
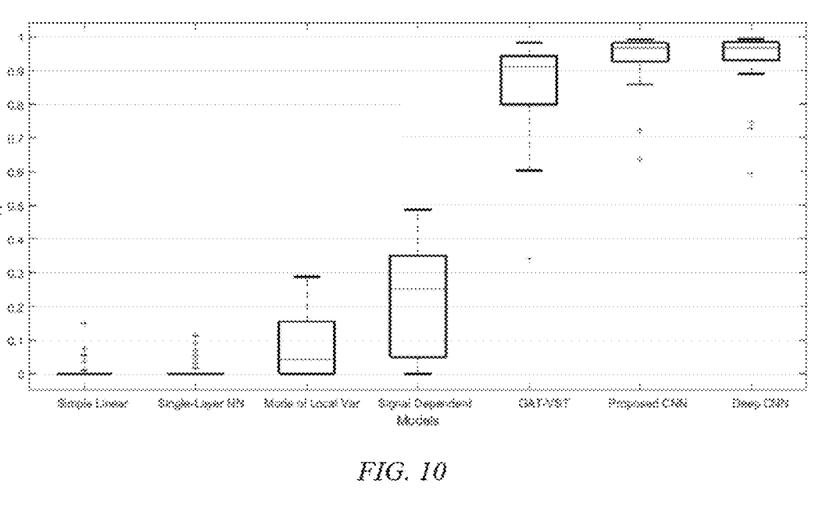
FIG. 10 is a graphical illustration of a comparison of the goodness of fit for various noise estimation models and the proposed CNN model.

A comparison of the model of the present invention with the results of other possible models or methods on the RENOIR Mi3 phone images was performed. For this comparison a simple linear model, a single-layer feed forward neural network, a mode of local variance model that does well in estimating additive and multiplicative Gaussian noise, a signal dependent noise model, the proposed CNN model, and a deeper CNN version of the model with an additional convolutional layer prior to the fully connected layers were observed. Each model tried to estimate the noise in various 32×32×1 image patches for a total of about 3,060,000 patches from the Mi3 camera. The results of these comparisons can be seen in FIG. 10.

The simple linear regression and the single feed forward neural network models made terrible estimations shown by a median $R^2$ measure of 0. The mode of local variance model performed slightly better on real low-light noise, however as stated previously this model was meant for Gaussian noise estimation and this is reflected by its median $R^2$ measure of 0.05. The signal dependent noise model was meant for real low-light noise estimation. To get the signal dependent noise model to estimate a 32×32×1 noise patch, it was necessary to estimate the noise level functions of various cropped patches (1000×1000) for a given image. This was necessary because difficulties were observed when trying estimate the noise level function for the original 3000×3000 image resolution. The mean intensity value of the patch of interest was found and then the appropriate local noise level function was used for that patch. The median $R^2$ measure for the signal dependent model was around 0.25.

A Poisson-Gaussian VST method for single image noise estimation was also examined. The median $R^2$ for the Poisson-Gaussian VST method was measured as 0.91. Finally, both the proposed CNN and the deeper version (with an extra convolutional layer) performed slightly better and with less variation. The training time for this deeper CNN model on the 12 GB Nvidia Tesla K40c was about 1 hour.

From this experiment it was concluded that that the CNN is important for obtaining a good estimation of the noise level and a simple linear regression or even a simple 1-layer NN are not good enough for this purpose. Furthermore with the proposed CNN noise level estimation results are obtained which are much more accurate when compared to other methods proposed in the literature, such as the mode of local variance model or the signal dependent noise model, for small image patches.

The various single image methods were also compared on their quality of whole image noise estimation. In particular the signal dependent, CNN, and the VST methods on all the noisy images of the RENOIR dataset were examined. First the noise in a particular image was estimated using one of the methods and then the absolute difference between the estimated noise value and its true noise value given by the RENOIR dataset were observed. The results can be seen in Table 1. On average the proposed CNN estimates the image noise more accurately than the other single image models. Note that while the Iterative Poisson-VST is meant for Poisson noisy images it still gives reasonable noise estimation results.

TABLE 1

Whole image noise estimation experiments. Average difference between the noise level estimated by different methods and the true noise level.

| | Avg Mi3 | Std. Mi3 | Avg S90 | Std. S90 | Avg T3i | Std. T3i |
|---|---|---|---|---|---|---|
| CNN | 1.51 | 1.09 | 1.46 | 1.64 | 1.14 | 1.11 |
| Signal Dependent | 8.33 | 18.90 | 4.40 | 5.65 | 5.80 | 9.05 |
| GAT-VST | 6.24 | 6.22 | 3.05 | 2.25 | 12.22 | 5.89 |
| Poisson-VST | 6.96 | 6.15 | 6.86 | 3.60 | 9.15 | 6.20 |

The present invention may be embodied on various computing platforms that perform actions responsive to software-based methods. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described with reference to illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:
1. An image processing method, the method comprising:
dividing each training image of a dataset of training images into a plurality of training images patches;
applying an image processing algorithm, over a range of possible tuning parameters, to each of the plurality of training image patches to generate a plurality of performance curves;
constructing a loss function based upon the plurality of performance curves;
training a convolutional neural network (CNN) to optimize the loss function to establish a trained convolutional neural network;
predicting a specific tuning parameter for an image of interest using the trained convolutional neural network; and
performing image processing of the image of interest using the specific tuning parameter and the image processing algorithm to generate a processed image of interest.

2. The method of claim 1, further comprising:
dividing the image of interest into a plurality of image patches, and wherein predicting a specific tuning parameter for an image of interest using the trained convolutional neural network further comprises predicting a specific tuning parameter for each of the image patches of the image of interest using the trained convolutional neural network.

3. The method of claim 2, wherein performing image processing of the image of interest using the specific turning parameter and the image processing algorithm to generate a processed image of interest further comprises, performing image processing of the image of interest using the specific turning parameter of each of the image patches of the image of interest and the image processing algorithm to generate a plurality of processed image patches and combining the plurality of processed image patches to generate the processed image of interest.

4. The method of claim 1, wherein the image processing algorithm is selected from a denoising algorithm, an image super-resolution imaging algorithm, an image segmentation algorithm and an image inpainting algorithm.

5. The method of claim 1, wherein the image of interest is a noisy image of interest and wherein the processed image of interest is a denoised image of interest.

6. The method of claim 1, wherein the image processing algorithm is a denoising algorithm selected from a Block-Matching and 3D Filtering (BM3D) denoising algorithm, an Active Random Field algorithm, a Bi-Level Optimization Algorithm and a Multi-Layer Perceptron algorithm.

7. The method of claim 1, wherein the loss function is a function for maximizing peak signal-to-noise ratio (PSNR) loss over the dataset of training images.

8. The method of claim 1, wherein the loss function is a function for the maximizing variance over the dataset of training images.

9. An image denoising method, the method comprising:
dividing each training image of a dataset of training images into a plurality of training images patches;
applying an image denoising algorithm, over a range of possible tuning parameters, to each of the plurality of training image patches to generate a plurality of performance curves;
constructing a loss function based upon the plurality of performance curves;
training a convolutional neural network (CNN) to optimize the loss function to establish a trained convolutional neural network;
dividing a noisy image of interest into a plurality of image patches;
predicting a specific tuning parameter for each of the image patches of the noisy image of interest using the trained convolutional neural network;
performing image denoising of each of the image patches of the noisy image of interest using the specific tuning parameter of each of the image patches of the noisy image of interest and the image processing algorithm to generate a plurality of denoised image patches; and combining the plurality of denoised image patches to generate a denoised image of interest.

10. The method of claim 9, wherein the image denoising algorithm is selected from a Block-Matching and 3D Filtering (BM3D) denoising algorithm, an Active Random Field algorithm, a Bi-Level Optimization Algorithm and a Multi-Layer Perceptron algorithm.

11. The method of claim 9, wherein the loss function is a function for maximizing peak signal-to-noise ratio (PSNR) loss over the dataset of training images.

12. The method of claim 9, wherein the loss function is a function for the maximizing variance over the dataset of training images.

13. A system for image processing, the system comprising:
- one or more modules implemented at least partially in hardware, the one or more modules configured to perform operations comprising:
  - dividing each training image of a dataset of training images into a plurality of training images patches;
  - applying an image processing algorithm, over a range of possible tuning parameters, to the plurality of training images patches to generate a plurality of performance curves;
  - constructing a loss function based upon the plurality of performance curves;
  - training a convolutional neural network (CNN) to optimize the loss function to establish a trained convolutional neural network;
  - predicting a specific tuning parameter for an image of interest using the trained convolutional neural network, and
  - performing image processing of the image of interest using the specific tuning parameter and the image processing algorithm to generate a processed image of interest.

14. The system of claim 13, wherein the image processing algorithm is selected from a denoising algorithm, an image super-resolution imaging algorithm, an image segmentation algorithm and an image inpainting algorithm.

15. The system of claim 13, wherein the image of interest is a noisy image of interest and wherein the processed image of interest is a denoised image of interest.

16. The system of claim 13, wherein the image processing algorithm is a denoising algorithm selected from a Block-Matching and 3D Filtering (BM3D) denoising algorithm, an Active Random Field algorithm, a Bi-Level Optimization Algorithm and a Multi-Layer Perceptron algorithm.

17. The system of claim 13, wherein the dataset of training images is a RENOIR dataset of training images.

18. The system of claim 13, wherein the loss function is a function for maximizing peak signal-to-noise ratio (PSNR) loss over the dataset of training images.

19. The system of claim 13, wherein the loss function is a function for the maximizing variance over the dataset of training images.

* * * * *